(12) United States Patent
Leyvi

(10) Patent No.: US 7,126,614 B2
(45) Date of Patent: Oct. 24, 2006

(54) DIGITAL, HARDWARE BASED, REAL-TIME COLOR SPACE CONVERSION CIRCUITRY WITH COLOR SATURATION, BRIGHTNESS, CONTRAST AND HUE CONTROLS

(75) Inventor: Evgeniy Leyvi, Bronx, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 342 days.

(21) Appl. No.: 10/210,837

(22) Filed: Jul. 31, 2002

(65) Prior Publication Data

US 2004/0021671 A1  Feb. 5, 2004

(51) Int. Cl.
*G09G 5/02* (2006.01)

(52) U.S. Cl. ............ 345/604; 345/63; 345/77; 345/426; 345/602; 345/603; 345/605; 345/643; 345/690; 348/649; 348/663; 348/687; 382/167

(58) Field of Classification Search ............ 345/63, 345/77, 426, 589, 600–605, 643, 690; 348/649, 348/659, 663, 687, 720, 908; 382/167
See application file for complete search history.

(56) References Cited

U.S. PATENT DOCUMENTS 5,793,445 A * 8/1998 Lum et al. .............. 348/720
6,552,751 B1 * 4/2003 Shigeta ................. 348/659

* cited by examiner

*Primary Examiner*—Kee M. Tung
*Assistant Examiner*—Antonio Caschera

(57) ABSTRACT

A hardware-based circuitry for digital processing for color saturation control circuitry, brightness control circuitry, contrast control circuitry, and color hue control circuitry, some or all of which can be added to the luminance/chrominance (Y/C) signals to the red green blue (RGB) digital YCbCr-to-RGB conversion circuitry that is required by devices such as an LCoS display device. (these controls can also be used without the Y/C-to-RGB conversion surrounding. Important is the fact that the signals for control be in Y/C domain) A digital video signal from the source in the Y/C (luminance/chrominance) domain is fed into processing circuitry, where the C (chrominance) component is split into Cb and Cr subcomponents. Digital YCbCr-to-RGB conversion circuitry transforms the Y/C signals to RGB domain, required by, for example, the LCoS display device. Control circuitry according to the present invention to control color saturation, brightness, contrast and color hue is added to this YCbCr-to-RGB conversion circuitry.

9 Claims, 13 Drawing Sheets

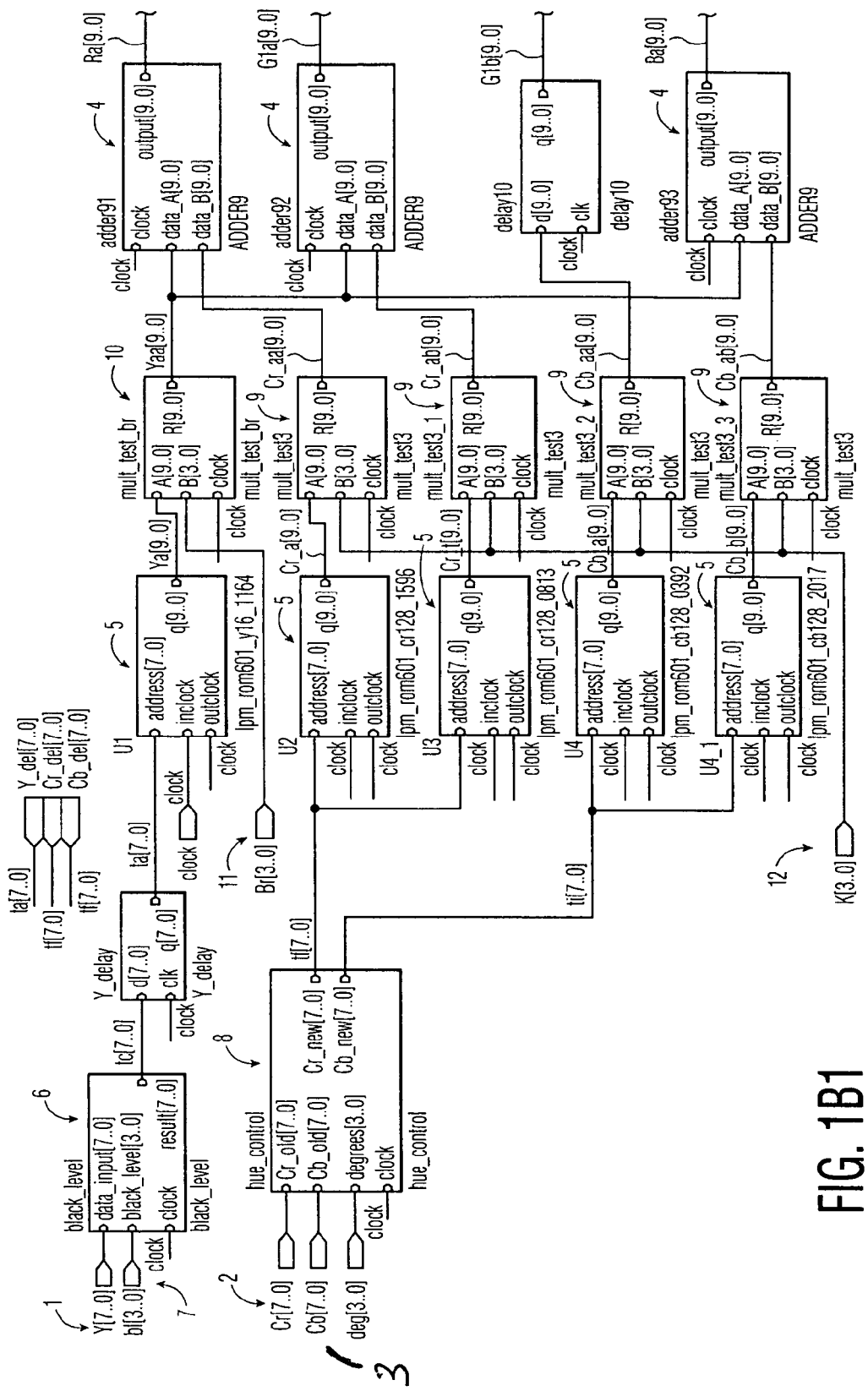
FIG. 1B1

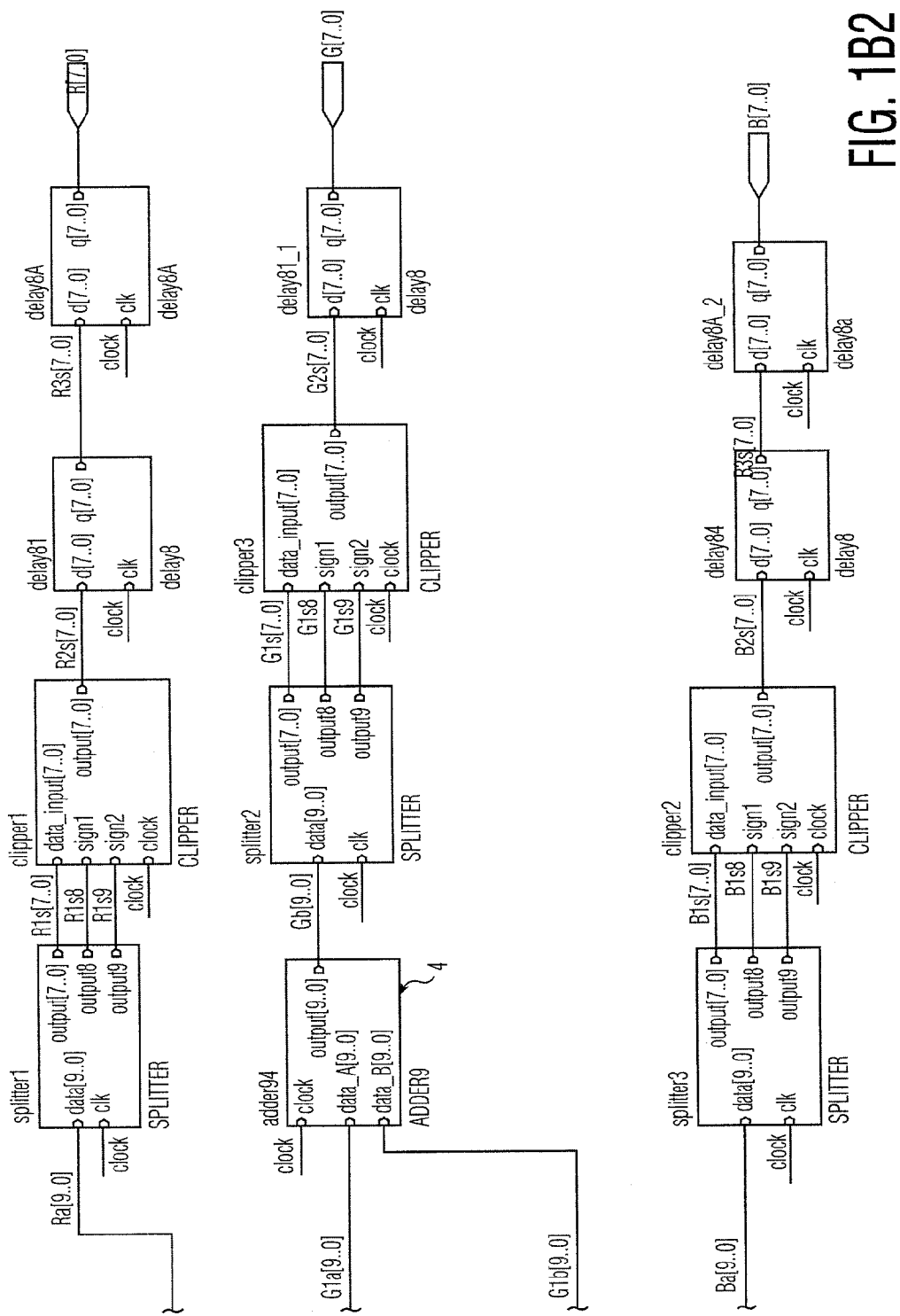
FIG. 1B2

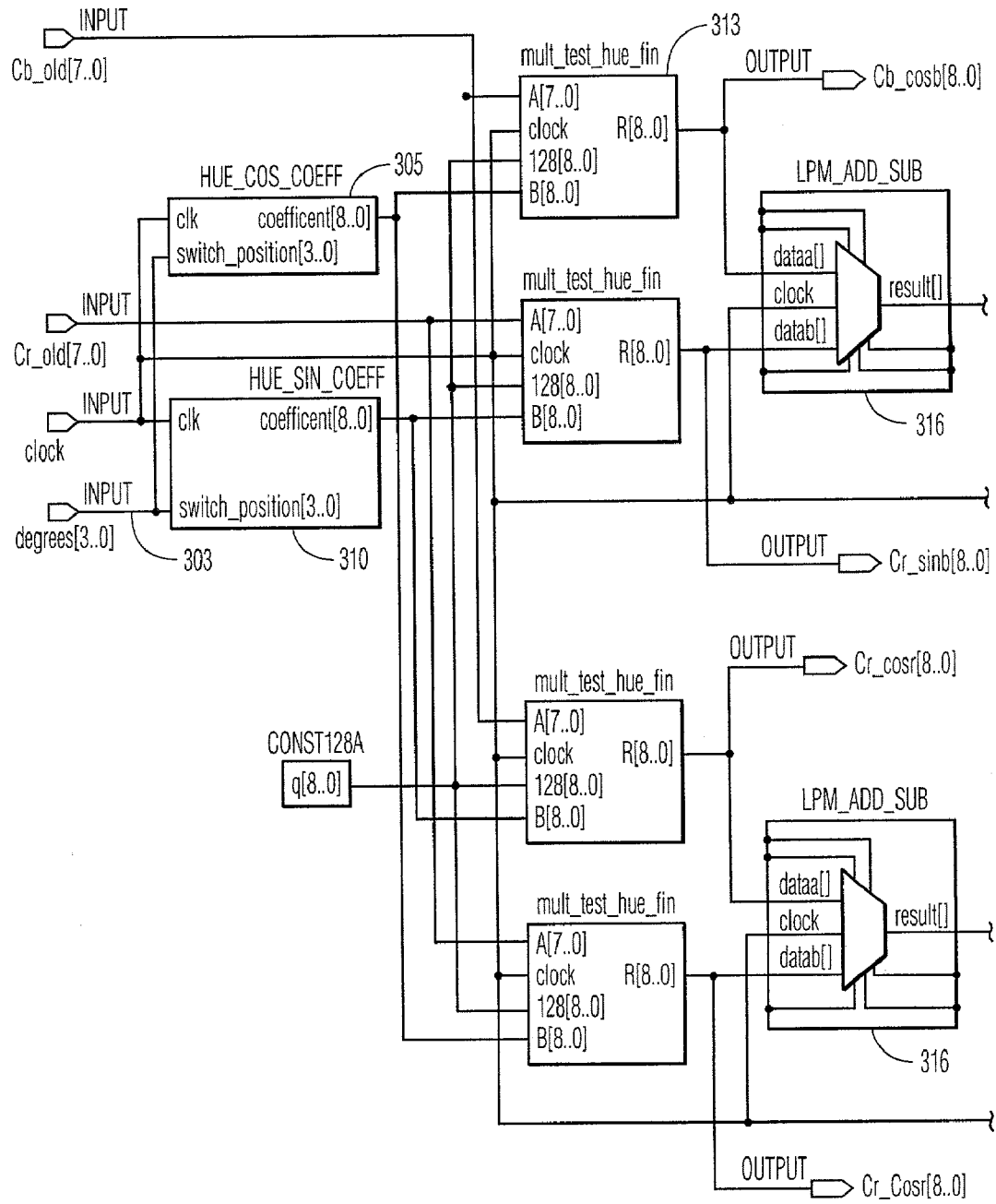
FIG. 3A1

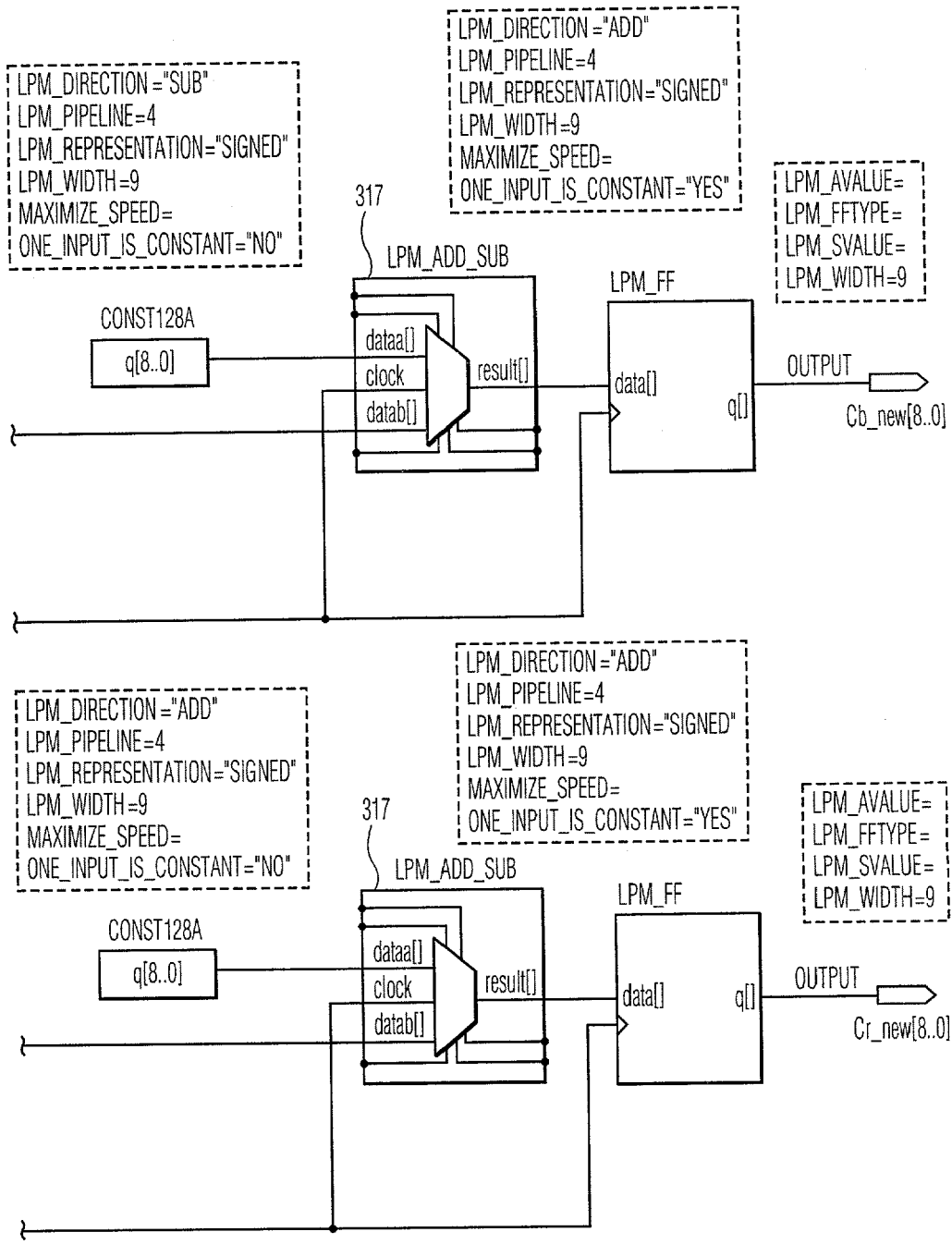
FIG. 3A2

DIGITAL, HARDWARE BASED, REAL-TIME COLOR SPACE CONVERSION CIRCUITRY WITH COLOR SATURATION, BRIGHTNESS, CONTRAST AND HUE CONTROLS

BACKGROUND OF THE INVENTION

1. Field of the Invention

The present invention is related to the control of image quality by image displays. More particularly, the present invention relates to a system for circuitry that provides control of image displays.

2. Description of the Related Art

Most image displays, being analog by design, employ color saturation, brightness, contrast and hue control circuitry, which works along with analog video signals. Similar circuits working with digitized video signals are used in post-processing film and video industry and are based on software driven microprocessor systems.

A new generation of digital image displays (for example, based on Liquid Crystal on Silicon (LCoS) technology, TFT-LCD, DLP and PDP), takes further advantage of its higher resolution by performing all video signal processing starting from the source in digital domain, thus eliminating the need for analog-to-digital (A/D) and digital-to-analog (D/A) converters in the signal path and avoiding digitizing artifacts in the displayed images.

There are several ways in which color projection can be performed using LCoS displays. One such example is referred to as "3-Chip Color" in which a series of prisms are arranged to form a color cube. Light, which typically originates from a lamp and then passes through a condenser lens to increase its uniformity (i.e. focus), subsequently passes through a dichroic filter to remove light outside the visible spectrum before striking a mirror, which directs the path of the light to the color cube.

After entering the cube, the light is subsequently split into three beams that project off three separate LCoS displays. Each of the respective LCoS displays has one of a red, green, or blue filter located in front. Each of the displays receives a different video signal with the correct image for its corresponding color. The cube then combines the reflected images that result in a final color image that is projected.

Another way that LCoS displays provide color is by a color wheel optical system, whereby light, which first passes through a condenser lens and a dichroic filter, subsequently passes through a color wheel that includes red, green and blue (and sometimes yellow and white) transmissive portions. The colored light may then pass through a quarter wave plate and subsequently reflect off the LCoS display and through a projector lens. The LCoS display changes color according to the particular color being projected (i.e. red, green, blue, and possibly even yellow) at multiples of the normal projection rate, so as to "fool" the eye into perceiving the projected images as an image in full color.

Yet another way that the color can be provided in, for example, TFT-LCD display is by the use of color dots, also fooling the perception of the eye to see the images in full color. By this method, a series of pixels have different color dots that are activated according to the color signal. The arrangement of the pixels and the particular ones turned on provides a perceived full color image to the human eye.

A single panel scrolling color method is yet another way that a full color image is perceived by the human eye. According to the scrolling method, the screen may, for example, be subdivided into different color images (such as red, green, blue, yellow, etc.). In the case of three color images, the sub-division can be into thirds that are vertically stacked, so that a vertical scroll of the different color images at speeds too fast to be detected by the human eye occurs, allowing for the perception of a full color image.

In all of the above methods (as well as others), the LCoS display devices require that the luminance/chrominance (Y/C) signals be converted to the red-green-blue (RGB) domain, as any display technology requires RGB signals. Most of the methods also require that the projected image be spatially rearranged (i.e. for a single panel scrolling color method the R, G and B components of the image must be presented to the display device according to the current position of the illumination color stripes). This kind of signal processing is preferably done in the digital domain due to higher accuracy and simplicity.

Accordingly, there is a need in the art to provide the consumer picture controls, such as brightness, contrast, color saturation and color hue, to be implemented digitally with minimal resources required to take further advantage of all-digital processing.

SUMMARY OF THE INVENTION

The present invention provides circuitry for hardware based real-time digital brightness, contrast, color saturation, and color hue control heretofore unknown in the art. In addition, the circuitry provides Y/C-to-RGB color space conversion capabilities.

The present invention comprises (1) digital color saturation control circuitry; (2) digital brightness control circuitry; (3) digital contrast control circuitry; and (4) digital color hue control circuitry, some or all of which can be added to the luminance/chrominance (Y/C) to the red-green-blue (RGB) digital transformation circuitry that is required by display devices, including but by no means not limited to an LCoS display device. The control circuitry can be used in the Y/C domain without the Y/C-to-RGB conversion surrounding.

According to a first aspect of the present invention, a digital video signal from the source in the Y/C (luminance/chrominance) domain is fed into processing circuitry, where the C (chrominance) component is split into Cb and Cr subcomponents by known methods (according to CCIR601, Cb and Cr are the scaled versions of U and V in the YUV color space). Digital YcbCr-to-RGB transformation circuitry transforms the Y/C signals to the RGB domain, required by, for example, devices such as an LCoS display device. Control circuitry according to the present invention to control color saturation, color hue, brightness and contrast and is added to this YcbCr-to-RGB transformation circuitry.

According to other aspects of the invention, proposed color saturation and contrast control circuitry can be inserted by the outputs of look-up tables and the inputs of adders and multipliers, the adders and multipliers having inputs of a respective look-up table and control coefficients. Contrast control can be achieved by multiplying the item containing the Y component of the video signal by the contrast coefficient. Color saturation can be achieved by multiplying Cb and Cr components of the video signal by the same color saturation coefficient. Brightness control and/or hue control can also be achieved in this manner. However, it should be understood that the location of the brightness, contrast, color saturation and color hue controls may be different in relation to the look-up tables.

The invention may include one of digital brightness control circuitry, color hue control circuitry, color saturation circuitry or contrast control circuitry, combinations thereof, or all of the proposed circuitry.

DETAILED DESCRIPTION OF THE INVENTION

In the particular embodiments of the invention described below, it is proposed that a serial digital video signal, which conforms to the SMPTE 292 or SMPTE 259 standard from sources such as, for example, a AJ-HD2700P Panasonic video tape player, in the Y/C domain is fed into processing circuitry of an Altera 10K50EQC-240-1 field programmable gate array IC, but it should be understood by the artisan that other standards or processing circuitry could be used that are far beyond equivalent substitutes for the above-mentioned hardware items and standards.

The YcbCr-to-RGB conversion process is based upon the following mathematical formulas defined in the CCIR-601 recommendation:

For Red: $R=1.164*(Y-16)+1.596*(Cr-128)$;

For Green: $G=1.164*(Y-16)-0.813*(Cr-128)-0.392*(Cb-128)$;

For Blue: $B=1.164*(Y-16)+2.017*(Cb-128)$.

Figure 1A:
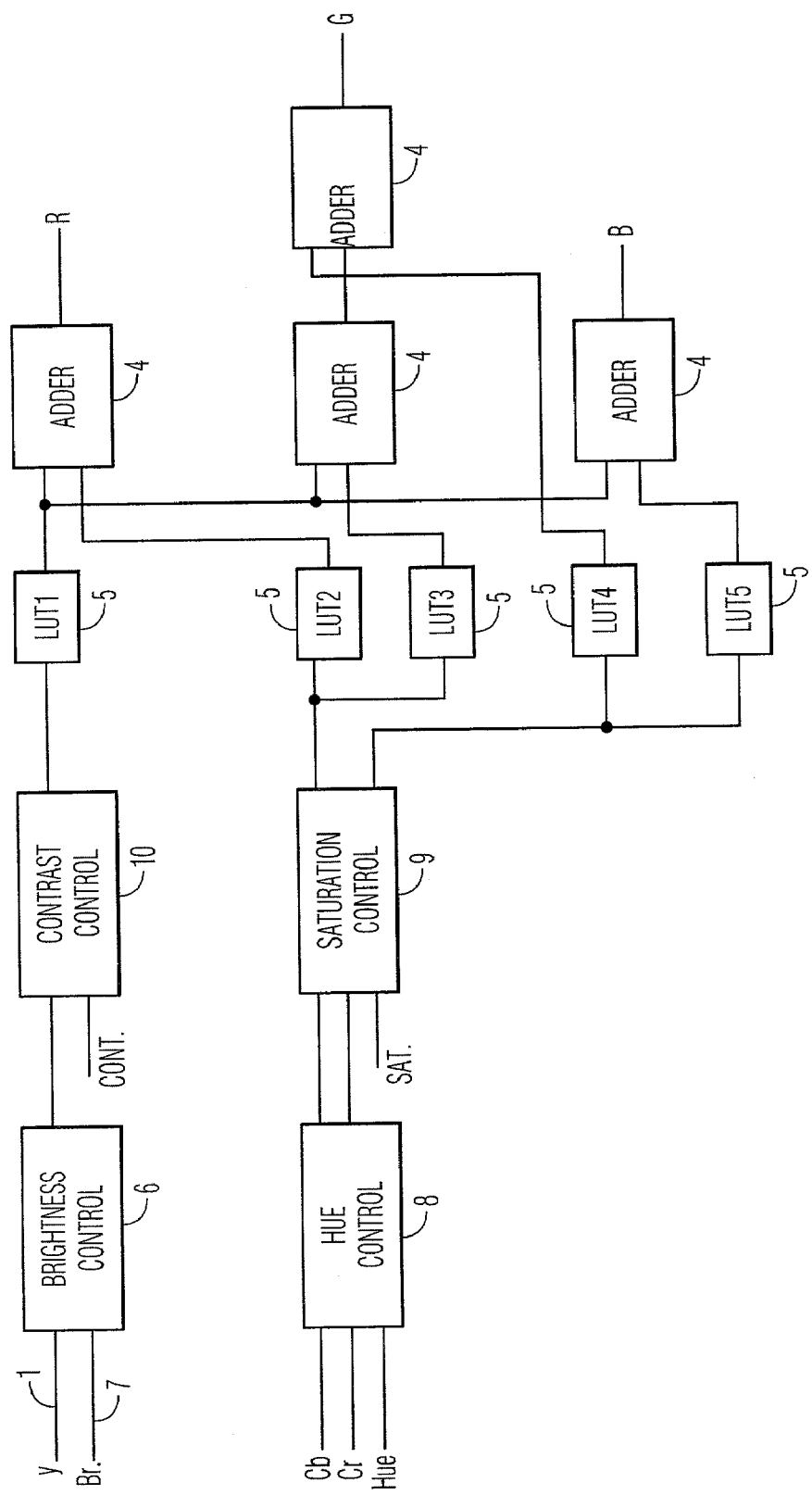
FIGS. 1A and 1B, presented as FIGS. 1B1 and 1B2, schematically illustrate simplified and detailed overviews, respectively, of the control circuitry according to the present invention.
Figure 1B:
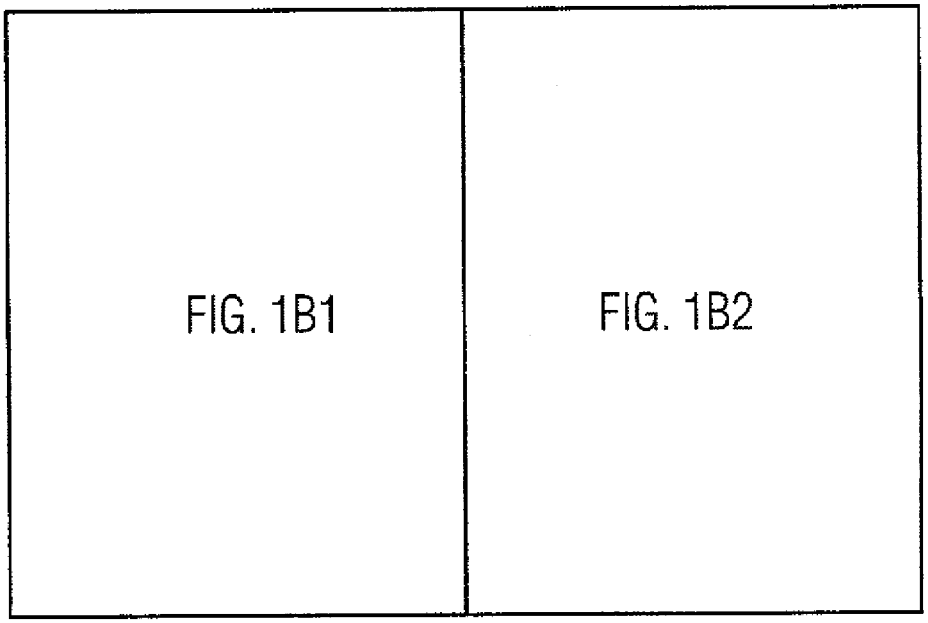

FIGS. 1A and 1B provide an overview of a schematic according to the present invention. They represent Y/C-to-RGB converters with controls to obtain the red, green and blue outputs.

One method to calculate each item in the above formulas is to use look-up tables 5 (as shown in FIGS. 1A, 1B), whose inputs would be either Y 1, Cb 3 or Cr 2 data (as all shown in FIG. 1B), and the outputs would be followed by adders 4 to calculate the final results.

Brightness Control

Figure 2A:
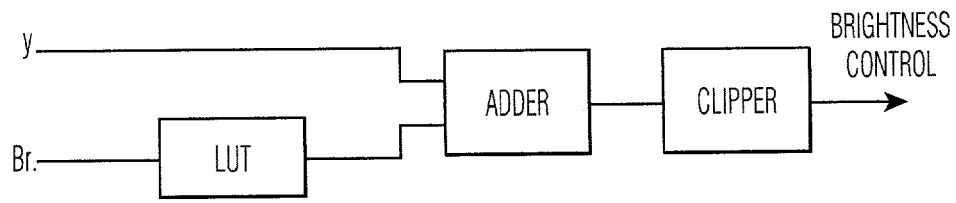
FIGS. 2A to 2D schematically illustrate simplified brightness control circuit, contrast control circuit, saturation control circuit and hue control circuit, respectively.

As shown in FIG. 1A, in a first aspect of the invention, proposed brightness control circuitry 6 is inserted in the Y signal path before the lookup tables 5. The brightness control, which in this particular instance has an output fed to contrast control 10 (as shown in FIG. 1B), employs an adder 4, which adds a controllable additional brightness level 7 to the Y signal. FIG. 2A shows a more detailed illustration of the proposed brightness control 6 shown in FIG. 1A, in this case without a contrast control in the circuit.

Brightness control is the process of adding a constant value to the luminance signal. According to a more detailed representation of the brightness control circuitry in FIG. 6, an incoming unsigned luminance signal Y (data_input 7 ... 0) 605 that is 8 bits wide in this application is converted to a signed 9 bits wide signal in 'clipper_black' block 610 by padding the original Y signal with additional '0' as a MSB.

Figure 6:
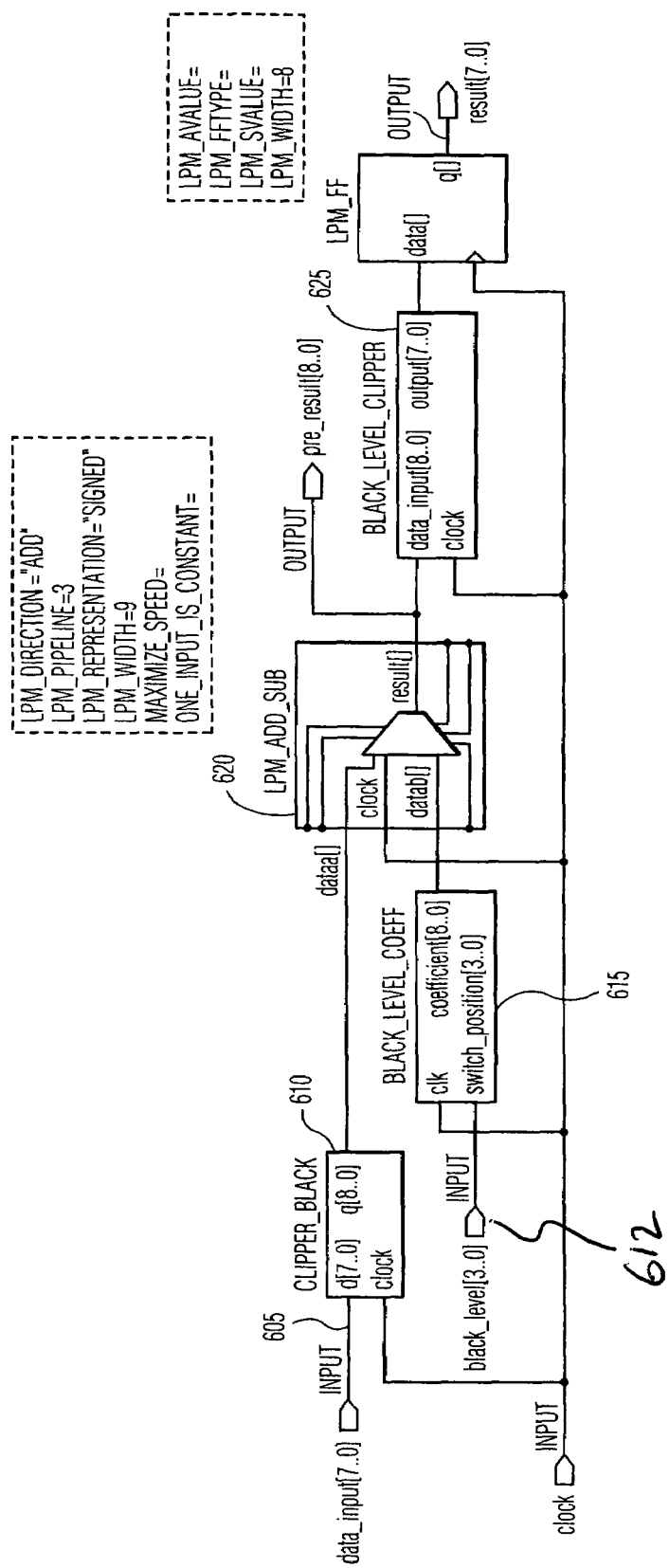
FIG. 6 schematically illustrates a brightness control circuitry 6 shown in FIG. 1B (i.e., FIG. 1B1) according to an aspect of the present invention.

As shown in FIG. 6, 'Black_level_coefficient' block 615 outputs a 9 bits wide signed signal, whose value is added to the luminance signal at 'adder' 620. The range of brightness control in this application is from +5% to −3% of the maximum brightness (digital value of 255 in case of 8 bits bus), which translates into adding a digital value from +14 to −8 to the luminance signal. With a different brightness control range, the additional values will also be different. Those values can be either equally spaced throughout the control range, or at different intervals and the precision of the steps may vary as well. A look-up table, which translates the 'brightness control' switch position 612 into the value of the brightness control signal follows, but it should be noted that in this application, although a 16 position switch is used, different applications may have a more precise control with different brightness control signal values. The same above applies to all other controls:

```
WHEN "0000" =>
    coefficient <= "000001110";    -- '+14'
WHEN "0001" =>
    coefficient <= "000001100";    -- '+12'
WHEN "0010" =>
    coefficient <= "000001010";    -- '+10'
WHEN "0011" =>
    coefficient <= "000001000";    -- '+8'
WHEN "0100" =>
    coefficient <= "000000110";    -- '+6'
WHEN "0101" =>
    coefficient <= "000000100";    -- '+4'
WHEN "0110" =>
    coefficient <= "000000010";    -- '+2'
WHEN "0111" =>
    coefficient <= "000000000";    -- '0'
WHEN "1000" =>
    coefficient <= "111111110";    -- '-2'
WHEN "1001" =>
    coefficient <= "111111100";    -- '-4'
WHEN "1010" =>
    coefficient <= "111111010";    -- '-6'
WHEN "1011" =>
    coefficient <= "111111000";    -- '-8'
```

It should be noted that the above is not strictly a look-up table. These items comprise a part of a VHDL code, which assigns a value to the output signal 'coefficient', based in the value of the input signal. The same is true for other 'look-up' tables listed herein.

The output of the adder 620 can be either positive or negative. 'Black_level_clipper' 625 block clips the levels having negative values to 0 (if the $9^{th}$ and the $8^{th}$ bits of the adder output are '1', the signal is negative) and the levels above 255 (if the $9^{th}$ bit of the adder output is '1' and $8^{th}$ bit is '0') to 255. It is not necessary to use a 10 bits wide bus (saves logic) in this application since the maximum adder output signal value is 255+14=269 and all the levels between 255 and 269 will have $9^{th}$ bit as '1' and $8^{th}$ bit as '0'. In case of a negative value, the minimum is 0−8=−8 and both $9^{th}$ and $8^{th}$ bits will be '1'. It should be noted that this minimum value can be different with other control ranges.

Hue Control

Figure 2B:
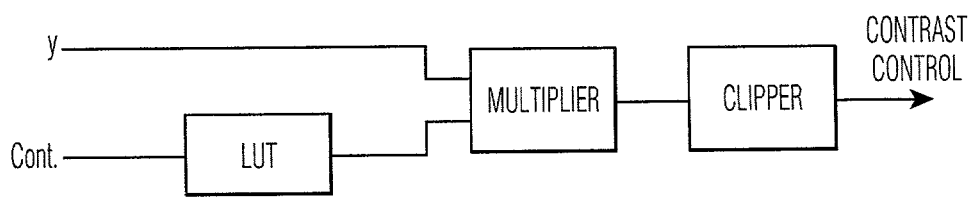
Figure 2C:
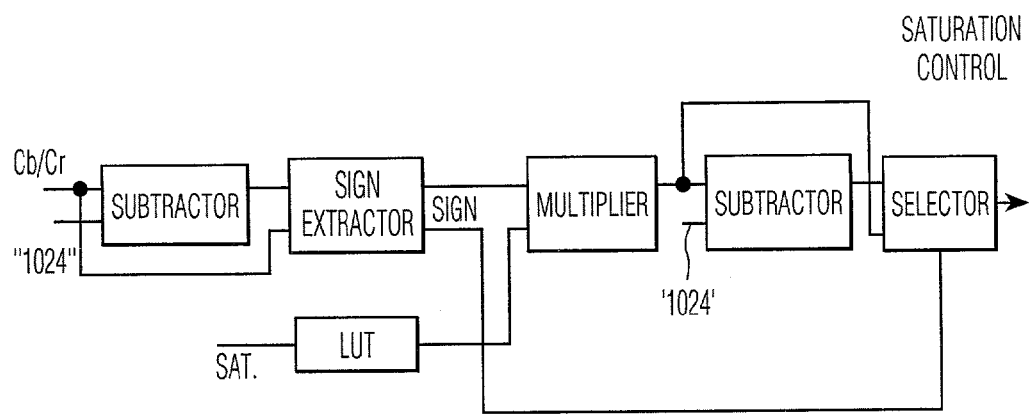
Figure 2D:
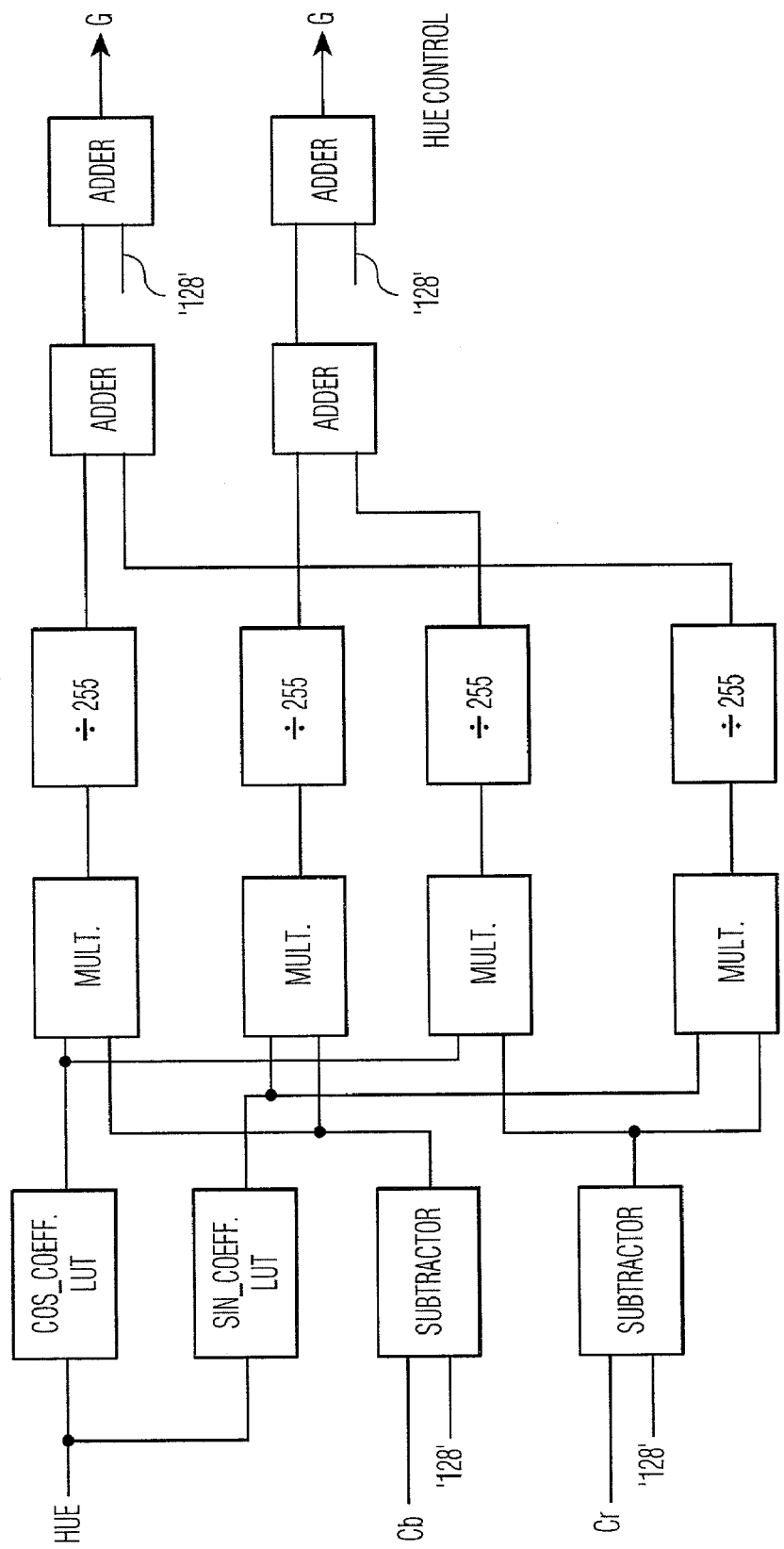

As shown in FIG. 2D, a proposed hue control circuitry 8 is inserted in the Cb/Cr path and presents a combination of multipliers and adders that perform the following function:

$Cb\_new = (\cos A*(Cb-128) - \sin A*(Cr-128)) + 128;$ and $Cr\_new = (\sin A*(Cb-128) + \cos A*(Cr-128)) + 128.$ Cb and Cr values of the chroma signal are the orthogonal vectors in the color space. A hue control is obtained by rotating this pair around a 'zero' point. The formulas for the hue control are given above, where 'A' is a degree of rotation and in this application is between +35 and −35 degrees. 'Hue_cos_coeff' block 305 and 'hue_sin_coeff' block 310 function to convert the 'hue control' switch position 303 into the corresponding values of the cosine and sin control signals (note, that cosine signal is always positive and sin signal can be both positive and negative depending on the direction of rotation, therefor the outputs of these look-up tables are 9 bits, where MSB is a sign bit). To avoid floating point multiplication, those coefficients are multiplied by 255 and rounded. The look-up tables follow:

```
--FOR COSINE:
    CASE switch_position IS
        WHEN x"F" =>
            coefficient <= "011111111"; -- no shift
        WHEN x"0" =>
            coefficient <= "011101110"; -- '+35'
        WHEN x"1" =>
            coefficient <= "011110010"; -- '+30'
        WHEN x"2" =>
            coefficient <= "011110110"; -- '+25'
        WHEN x"3" =>
            coefficient <= "011111001"; -- '+20'
        WHEN x"4" =>
            coefficient <= "011111011"; -- '+15'
        WHEN x"5" =>
            coefficient <= "011111101"; -- '+10'
        WHEN x"6" =>
            coefficient <= "011111110"; -- '+5'
        WHEN x"7" =>
            coefficient <= "011111111"; -- no shift
        WHEN x"8" =>
            coefficient <= "011111110"; -- '-5'
        WHEN x"9" =>
            coefficient <= "011111101"; -- '-10'
        WHEN x"A" =>
            coefficient <= "011111011"; -- '-15'
        WHEN x"B" =>
            coefficient <= "011111001"; -- '-20'
        WHEN x"C" =>
            coefficient <= "011110110"; -- '-25'
        WHEN x"D" =>
            coefficient <= "011110010"; -- '-30'
        WHEN x"E" =>
            coefficient <= "011101110"; -- '-35'
        WHEN others =>
            coefficient <= "011111111"; -- no shift
    END CASE;
--FOR SIN:
    CASE switch_position IS
        WHEN x"F" =>
            coefficient <= "000000000"; -- no shift
        WHEN x"0" =>
            coefficient <= "001010110"; -- '+35'
        WHEN x"1" =>
            coefficient <= "001001110"; -- '+30'
        WHEN x"2" =>
            coefficient <= "001000001"; -- '+25'
        WHEN x"3" =>
            coefficient <= "000110101"; -- '+20'
        WHEN x"4" =>
            coefficient <= "000100111"; -- '+15'
        WHEN x"5" =>
            coefficient <= "000011010"; -- '+10'
        WHEN x"6" =>
            coefficient <= "000001101"; -- '+5'
        WHEN x"7" =>
            coefficient <= "000000000"; -- no shift
        WHEN x"8" =>
            coefficient <= "111110011"; -- '-5'
        WHEN x"9" =>
            coefficient <= "111100110"; -- '-10'
        WHEN x"A" =>
            coefficient <= "111011001"; -- '-15'
        WHEN x"B" =>
            coefficient <= "111001011"; -- '-20'
        WHEN x"C" =>
            coefficient <= "110111111"; -- '-25'
        WHEN x"D" =>
            coefficient <= "110110010"; -- '-30'
        WHEN x"E" =>
            coefficient <= "110100101"; -- '-35'
        WHEN others =>
            coefficient <= "000000000"; -- no shift
    END CASE;
```

Figure 3A:
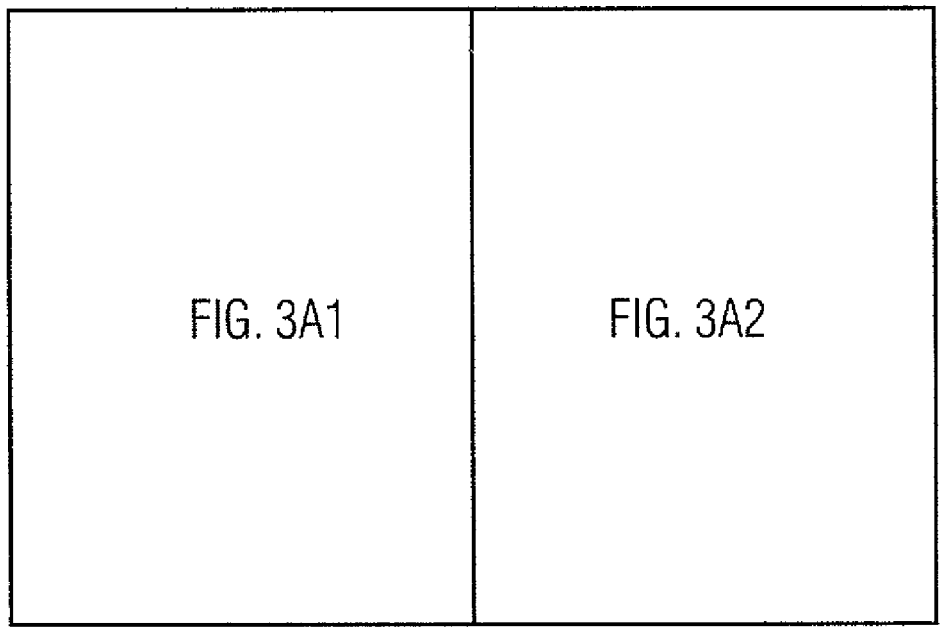
FIG. 3A, presented as FIGS. 3A1 and 3A2, schematically illustrates a color hue control circuitry 8 shown in FIG. 1B (i.e., FIG. 1B1).
Figure 3B:
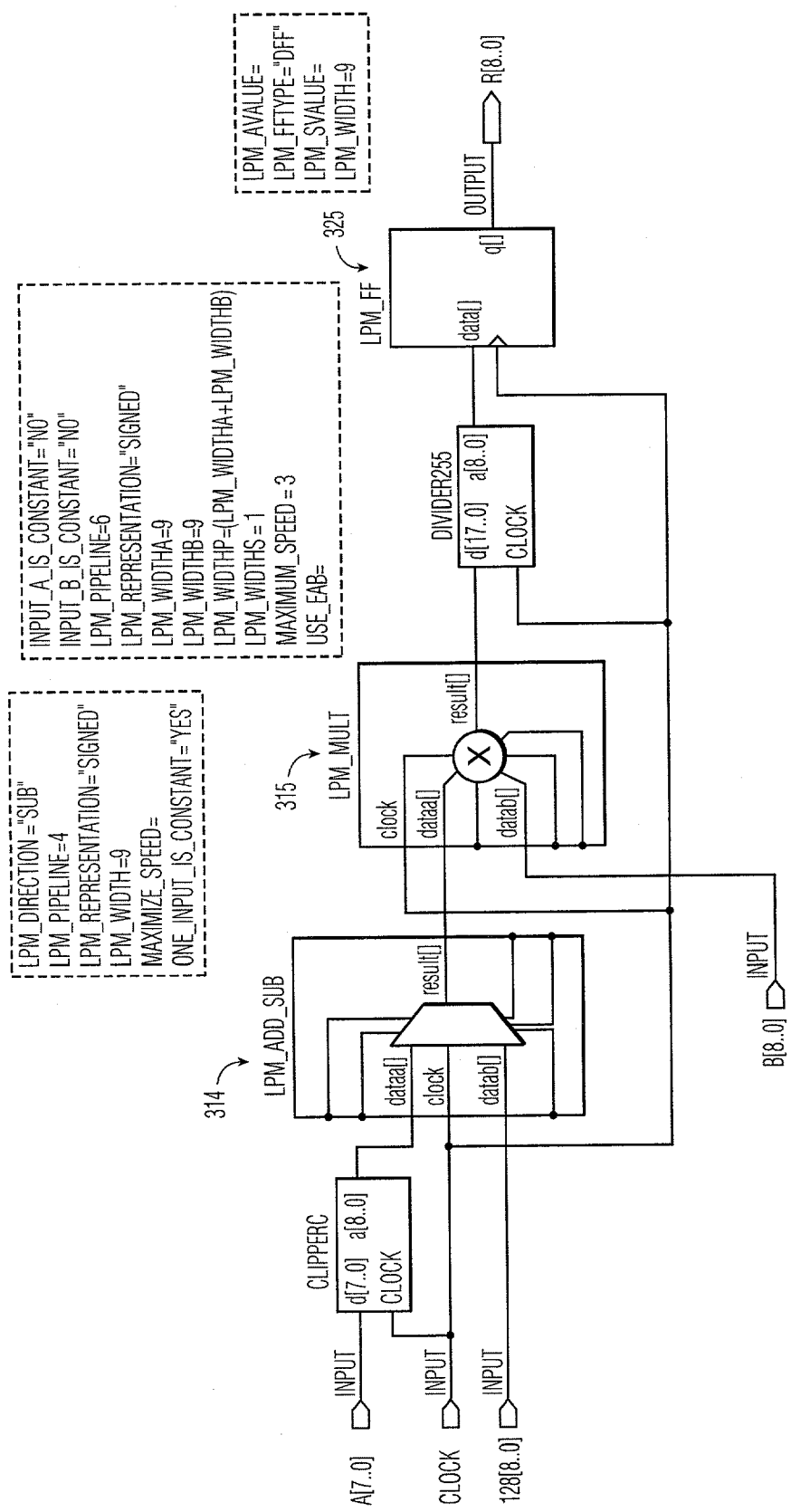
FIG. 3B schematically illustrates a multiplier for the color hue control circuitry.

The cos/sin A*(Cb/Cr−128) operations are performed inside the block labeled 'mult_test_hue_fin' 313, whose detailed illustration is shown in FIG. 3B. First, the incoming 8 bits wide unsigned chroma signals Cb and Cr are converted to 9 bits wide signed signals and their values are checked for the conformity with CCIR-601 specification, otherwise they are clipped between the values 16 and 240—the ranges of the chroma signal as defined in the CCIR-601. Then the value of '128' is subtracted from the signals in the 'LPM_ADD_SUB' blocks 314 (FIG. 3B). The output of the block 314—a signed value is fed into the first input of the 'multiplier' 315 (FIG. 3B). The second input of the 'multiplier' 315 is the output of the 'hue_cos_coeff'/'hue_sin_coeff' blocks 305, 310. The 'divider255' 325 (FIG. 3B). block divides the result of the multiplication operation by 255. This value is presented to the output of the 'mult_test_hue_fin' blocks 313. The output values of the corresponding 'mult_test_hue_fin' blocks 313 are added in the two 'adders' 316 (FIG. 3A), whose outputs still represent 9 bits wide signed values. Then the value of '128' is added to these values in 'adders' 317 (FIG. 3A) to return the Cb and Cr signals to their defined range −16 to 240.

Contrast Control

Figure 4:
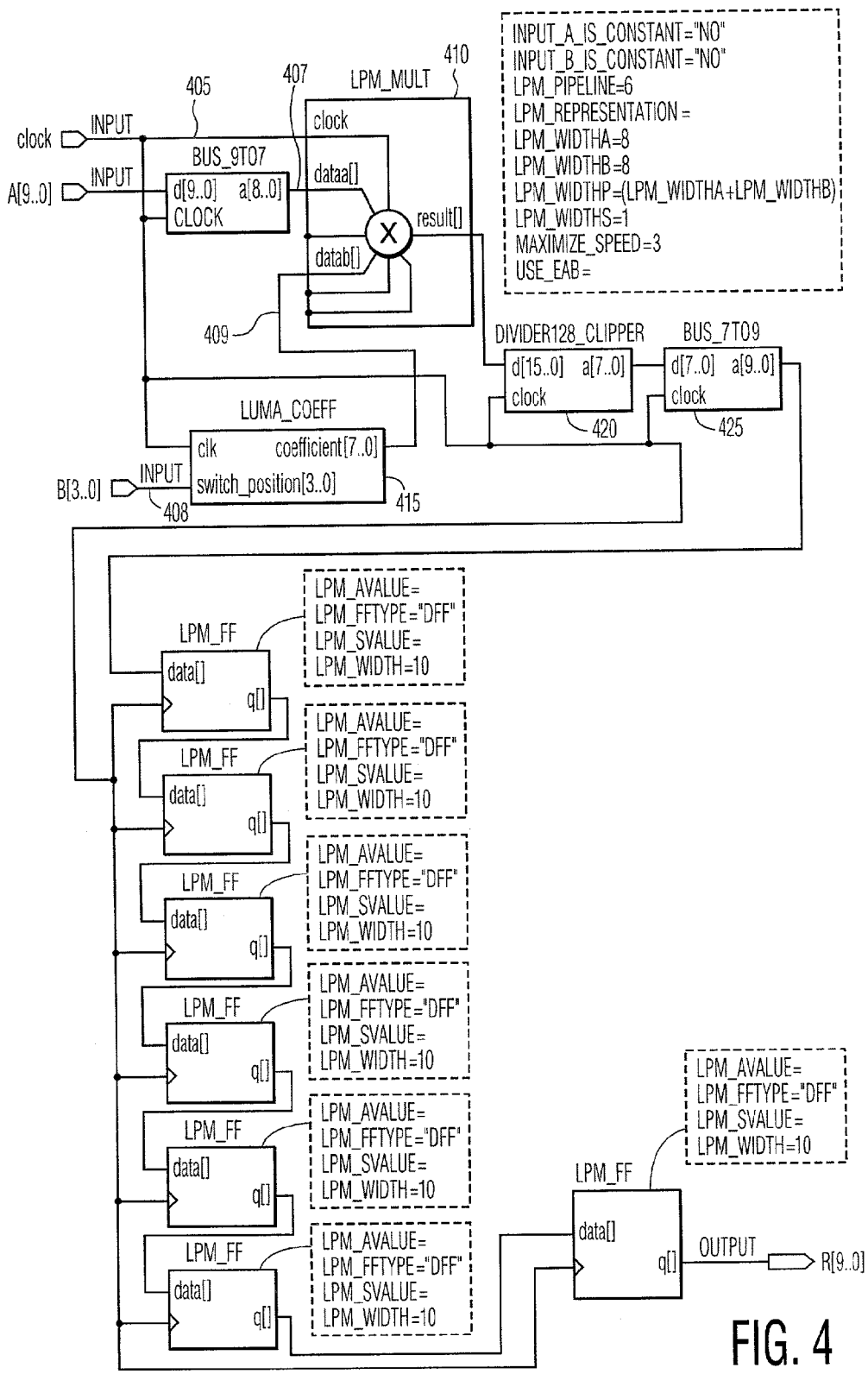
FIG. 4 schematically illustrates a contrast control circuitry 10 shown in FIG. 1B (i.e., FIG. 1B1).

FIG. 2B illustrates a basic contrast control, with a Y signal being one input to a multiplier, and a control signal as an input to a look up table, whose output being a second input to the multiplier. The multiplier output is then fed to a clipper. FIG. 4 shows a more detailed illustration of the proposed contrast control circuitry shown in FIG. 2B.

Contrast control is a process of multiplying a luminance signal by a constant value. A 10 bits wide output signal from a look-up table is converted to a 8 bits wide signal (look-up table output is always positive and between 0 and 255, therefor there is no signal degradation) in the blocked marked 'bus_9to7' 405 and fed to one input 407 of the 'multiplier' 410. The second input 409 of the 'multiplier' 410 is the output of the look-up table 415, which converts 'contrast control' switch position 408 into the value of the contrast control signal—the second multiplicand. Contrast control range in this application is from +35% to −40%. To avoid floating point multiplication, the contrast multiplication coefficients from 1.35 to 0.6 are multiplied by 128 and rounded to obtain an integer number, which is the output of the 'luma_coefficient' block 415. The look-up table inside the 'luma_coefficient' block 415 contains the following:

```
CASE switch_position IS                --128 x
    coefficient
    WHEN "1111" =>
        coefficient <= "01001100";     --.60
    WHEN "1110" =>
        coefficient <= "01010011";     --.65
    WHEN "1101" =>
        coefficient <= "01011001";     --.70
    WHEN "1100" =>
        coefficient <= "01100000";     --.75
    WHEN "1011" =>
        coefficient <= "01100110";     --.80
    WHEN "1010" =>
        coefficient <= "01101100";     --.85
    WHEN "1001" =>
        coefficient <= "01110011";     --.90
    WHEN "1000" =>
        coefficient <= "01111001";     --.95
    WHEN "0111" =>
        coefficient <= "10000000";     --normal
    WHEN "0110" =>
        coefficient <= "10000110";     --1.05
    WHEN "0101" =>
        coefficient <= "10001100";     --1.1
    WHEN "0100" =>
        coefficient <= "10010011";     --1.15
    WHEN "0011" =>
        coefficient <= "10011001";     --1.2
    WHEN "0010" =>
        coefficient <= "10100000";     --1.25
    WHEN "0001" =>
        coefficient <= "10100110";     --1.3
    WHEN "0000" =>
        coefficient <= "10101100";     --1.35
    WHEN others =>
        coefficient <= "10000000";
END CASE;
```

The output of the multiplier is fed into the 'divider128_clipper' block 420, which divides the result of multiplication operation by 128 and clips the result, if necessary, to 255 (in case of an 8 bits wide bus). The 'bus 7to9' block 425 converts the 8 bits wide signal to the original incoming format—10 bits wide signal by padding the signal with '0' values at two MSB positions.

Saturation Control

The proposed color saturation control circuitry 9 (shown in FIGS. 1A, 1B, whose simplified version is shown in FIG. 2C) is inserted between the outputs of look-up tables 5 and inputs of the adders 4 and present multipliers, whose two inputs are the output of an appropriate look-up table and the control color saturation coefficient 12.

Figure 5:
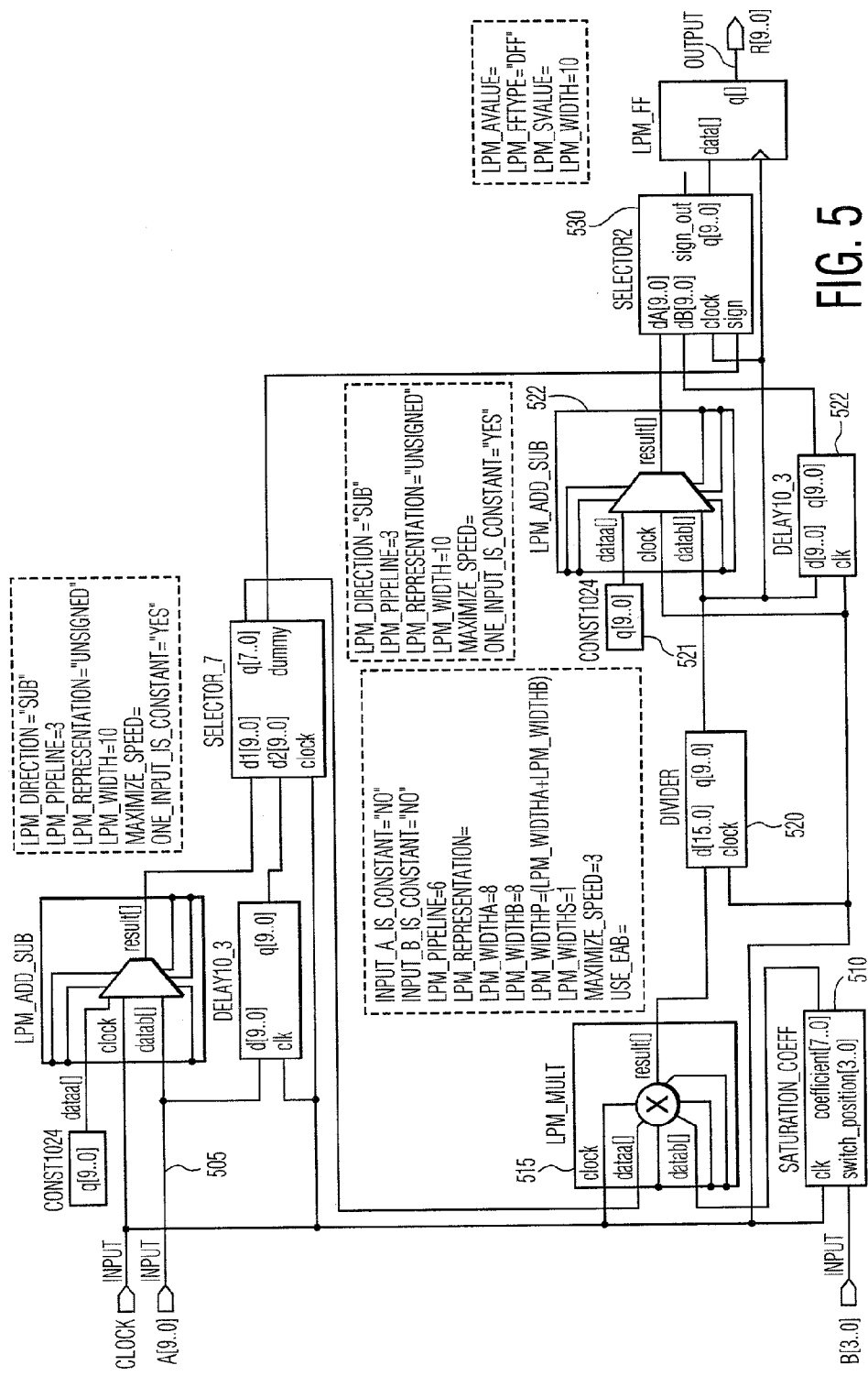
FIG. 5 schematically illustrates a color saturation control circuitry 9 shown in FIG. 1B (i.e., FIG. 1B1) according to an aspect of the present invention.

Saturation is the process of multiplying the chroma signal C (or its components Cb and Cr) by the same constant value. As shown in FIG. 5, a chroma input "A(9 . . . 0)" 505 to the control circuitry—the outputs of the look-up tables 5 (see main block diagram in FIG. 1A) can be either positive or negative. To avoid signed multiplication and save logic, the negative numbers are converted to positive (i.e.—the absolute value is obtained) and the polarity (sign) of the incoming signal is stored. This provides one input to the 'multiplier' 515. The second input to the 'multiplier' 515 is the output of 'saturation_coeff' block 510, which converts 'saturation control' switch position into the value of the saturation control signal—the second multiplicand. The range of the saturation control is +/−50% in this application. To avoid floating point multiplication, the saturation multiplication coefficients from 1.5 to 0.5 are multiplied by 64 and rounded to obtain an integer number, which is the output of the 'saturation_coeff' block 510. The look-up table inside this block is made up of the following:

```
CASE switch_position IS                --64 x coeff
    WHEN "1111" =>
        coefficient <= "00100000";     --.5
    WHEN "1110" =>
        coefficient <= "00100110";     --.6
    WHEN "1101" =>
        coefficient <= "00101101";     --.7
    WHEN "1100" =>
        coefficient <= "00110011";     --.8
    WHEN "1011" =>
        coefficient <= "00111010";     --.9
    WHEN "1010" =>
        coefficient <= "01000000";     --normal
    WHEN "1001" =>
        coefficient <= "01000011";     --1.05
    WHEN "1000" =>
        coefficient <= "01000110";     --1.1
    WHEN "0111" =>
        coefficient <= "01001010";     --1.15
    WHEN "0110" =>
        coefficient <= "01001101";     --1.2
    WHEN "0101" =>
        coefficient <= "01010000";     --1.25
    WHEN "0100" =>
        coefficient <= "01010011";     --1.3
    WHEN "0011" =>
        coefficient <= "01010110";     --1.35
    WHEN "0010" =>
        coefficient <= "01011010";     --1.4
    WHEN "0001" =>
        coefficient <= "01011101";     --1.45
    WHEN "0000" =>
        coefficient <= "01100000";     --1.5
    WHEN others =>
        coefficient <= "01000000";
END CASE;
```

The 'divider' block 520 divides the result of the multiplication operation by 64. The second 'LPM_ADD_SUB', 525 'selector2' 530, 'delay10__3' 522 and 'const1024' 521 combination of blocks restores the polarity (sign) of the signal to its original value.

Various modifications can be made by a person of ordinary skill in the art that would like within the spirit of the invention and the scope of the appended claims. For example, the bus may be a different width than 8 bits, the arrangement of look up tables relative to adders and/or multipliers can be arranged according to need.

What is claimed is:

1. A digital color space circuitry for conversion of Y/C to RGB, said circuitry comprising:
   means for separating a luminance/chrominance (Y/C) digital video signal input into Y, Cb and Cr component signals;
   means for brightness control for adding a constant value to the Y component signal, said means for brightness control including a brightness control switch for selecting a level of brightness control from one of a predetermined plurality of values, said means for brightness control include: (i) means for converting an unsigned 8 bits wide brightness signal to a 9 bits wide signed brightness signal, (ii) means for adding a signed brightness control value to a signed brightness signal and (iii) means for clipping the resulting signed brightness signal between the values of 0 and 255 (in case of an 8 bits bus width);
   means for hue control arranged to receive an input of the Cb and Cr signal components, the means for hue control includes means for converting unsigned 8 bit Cb and Cr signals into 9 bit signed signals that are clipped between values of 16 and 240, subsequently subtracting a value of 128 from the 9 bit signed signal and for performing the following functions on the respective Cb and Cr components:

$$Cb\_new=(\cos A*(Cb-128)-\sin A*(Cr-128))+128;$$

and $$Cr\_new=(\sin A*(Cb-128)+\cos A*(Cr-128))+128;$$

where "A" is a degree of rotation;
said means for hue control further includes a hue control switch for selecting one of plurality of predetermined values of hue control, means for converting each one of the plurality of predetermined switch positions into associated values of cosine and sin control values, said values of cosine and sin control values being multiplied by 255 to avoid floating point multiplication, said cosine and sin control values being fed to a multiplier, subsequently divided by 255 by a divider and a value of 128 added to the values divided by 255 by an adder;
means for contrast control for multiplying the luminance Y signal by a contrast control constant value, said means for contrast control including a contrast control switch for selecting a level of contrast control from one of a predetermined plurality of values, said means for contrast control includes: (i)means for converting a 10 bit wide output signal from a selected one of a plurality of Y/C-to-RGB converter look-up tables, whose input is a Y signal to a 8 bit wide signal, (ii)means for multiplying the 8 bit wide signal by a contrast control constant value, and (iii)means for dividing an output of the multiplication of the multiplied 8 bit wide signal times the constant value by 128;
means for saturation control for multiplying chrominance component signals Cb and Cr by a constant value, including a saturation control switch for selecting a level of saturation control from a plurality of predetermined saturation control levels, saturation control look-up tables for convening the selected value of the saturation control switch to a coefficient value, and means for multiplying the input of the chroma signals having positive values by a saturation coefficient associated with the saturation control switch for a particular setting.

2. The device according to claim 1, wherein the means for brightness control comprises:
(a) clipper black conversion means for converting the Y component signal from an 8 bit unsigned value to a 9 bit signed value,
(b) the brightness control switch selects the black level coefficient value output by the black level conversion means to one of a predetermined number of coefficient values;
(c) a brightness control look-up table for translating a black level coefficient value selected by the brightness control switch to a brightness control signal value;
(d) an adder for adding the translated black level coefficient value from the look-up table to the 9 bit signed value output by the clipper black means; and
(e) a black level clipper for clipping an output from the adder when the values output by the adder comprise values ranging from negative values to 0, and for values greater than a number of bits of a luminance bus as a power of 2.

3. A hue control device comprising:
means for receiving an input of the Cb and Cr signal components,
means for converting unsigned 8 bit Cb and Cr signals into 9 bit signed signals that are clipped between values of 16 and 240, subsequently subtracting a value of 128 from the 9 bit signed signal and for performing the following functions on the respective Cb and Cr components:

$$Cb\_new=(\cos A*(Cb-128)-\sin A*(Cr-128))+128;$$

and $$Cr\_new=(\sin A*(Cb-128)+\cos A*(Cr-128))+128;$$

where "A" is a degree of rotation
a hue control switch for selecting one of a plurality of predetermined values of hue control, the means for converting each one of the plurality of predetermined switch positions into associated values of cosine and sin control values, said values of cosine and sin control values being multiplied by 255 to avoid floating point multiplication, by multiplier and said cosine and sin values being fed to a multiplier, subsequently divided by 255 by divider and a value of 128 added to the values divided by 255 by adder.

4. A method for providing digital color space conversion from Y/C to RGB comprising the steps of:
(a) separating a luminance/chrominance (Y/C) digital video signal input into Y, Cb and Cr component signals;
(b) providing brightness control arranged to receive the Y component signal;
(c) providing an input of Cb and Cr signal components and for converting unsigned 8 bit Cb and Cr signals into 9 bit signed signals that are clipped between values of 16 and 240, subsequently subtracting a value of 128 from the 9 bit signed signal and performing the following functions on the respective Cb and Cr components:

$$Cb\_new=(\cos A*(Cb-128)-\sin A*(Cr-128))+128;$$

and $$Cr\_new=(\sin A*(Cb-128)+\cos A*(Cr-128))+128;$$

where "A" is a degree of rotation;
(d) selecting one of plurality of predetermined values of hue control by a particular setting of a hue control switch, converting each one of the plurality of predetermined switch positions into associated values of cosine and sin control values, said values of cosine and sin control values being multiplied by 255 to avoid floating point multiplication and being fed to a multiplier, subsequently divided by 255 and a value of 128 added to the values divided by 255;
(e) multiplying the luminance Y signal by a contrast control constant value, and selecting a level of contrast control by a setting of a contrast control switch from one of a predetermined plurality of coefficient values associated in a lookup table with a particular setting of the contrast control switch, converting a 10 bit wide output signal from a selected one of a plurality of Y/C-to-RGB converter look-up table, whose input is a Y signal to a 8 bit wide signal, and multiplying the 8 bit wide signal by a contrast control constant value, dividing an output of the multiplication of the multiplied 8 bit wide signal times the constant value by 128;

(f) multiplying chrominance component signals Cb and Cr by a constant value, selecting a level of saturation control from a plurality of predetermined saturation control levels of a saturation control switch so that saturation control look-up tables associated with a particular setting of the saturation control switch converts the selected value of the saturation control switch to a coefficient value, and multiplying the input of the chroma signals having positive values by a saturation coefficient associated with the saturation control switch for a particular setting.

5. The method according to claim 4, wherein step (b) comprises the following substeps:
(i) converting the Y component signal from an unsigned value to a signed value by a clipper black, and selecting a black level coefficient value,
(ii) providing a brightness control switch for selecting the black level coefficient value output from one of a predetermined number of coefficient values;
(iii) providing a brightness control look-up table for translating the black level coefficient value selected by the brightness control switch in substep (ii) to a brightness control signal value;
(iv) adding the translated black level coefficient value from the look-up table to the signed value output by the clipper black means; and
(v) clipping the added translated black level coefficient and the signed value output an output from substep (iv) by a black level clipper when the added value output comprises values ranging from negative values to 0, and for values larger than a predetermined value.

6. The method according to claim 5, wherein the signed value in step (b)(i) comprises a 9 bit signed value.

7. The method according to claim 5, wherein in step (v) the predetermined value comprises 255.

8. The method according to claim 4, further comprising providing at least four look-up tables for converting Cb/Cr components into functional augends, comprising a plurality of coefficient values, and converting outputs of negative values of the at least four look-up tables to positive values and storing the sign of the negative values.

9. A method for hue control comprising:
(a) receiving an input of Cb and Cr signal components,
(b) converting unsigned 8 bit Cb and Cr signals into 9 bit signed signals that are clipped between values of 16 and 240, subsequently subtracting a value of 128 from the 9 bit signed signal and performing the following functions on the respective Cb and Cr components:

$Cb\_new = (\cos A * (Cb-128) - \sin A * (Cr-128)) + 128;$ and $Cr\_new = (\sin A * (Cb-128) + \cos A * (Cr-128)) + 128;$ where "A" is a degree of rotation; and
(c) selecting one of a plurality of predetermined values of hue control by a particular setting of a hue control switch, and converting each one of the plurality of predetermined values into associated values of cosine and sin control values, said values of cosine and sin control values being multiplied by 255 to avoid floating point multiplication, and said cosine and sin values being subsequently divided by 255 and a value of 128 added to the values divided by 255.

* * * * *